(12) United States Patent
Iizuka et al.

(10) Patent No.: US 11,139,647 B2
(45) Date of Patent: Oct. 5, 2021

(54) WATERPROOF STRUCTURE

(71) Applicant: Yazaki Corporation, Tokyo (JP)

(72) Inventors: Hayato Iizuka, Kakegawa (JP); Yusuke Tsutagawa, Kakegawa (JP); Kazuma Kayo, Kakegawa (JP); Hajime Kato, Kakegawa (JP); Akihiro Saito, Kakegawa (JP); Kai Kiuchi, Kakagawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 16/738,742

(22) Filed: Jan. 9, 2020

(65) Prior Publication Data

US 2020/0227908 A1 Jul. 16, 2020

(30) Foreign Application Priority Data

Jan. 15, 2019 (JP) .............................. JP2019-004453

(51) Int. Cl.
*H02G 15/04* (2006.01)
*H01R 11/12* (2006.01)

(52) U.S. Cl.
CPC ............. *H02G 15/04* (2013.01); *H01R 11/12* (2013.01)

(58) Field of Classification Search
CPC ..... H02G 15/013; H02G 15/04; H02G 15/043
See application file for complete search history.

(56) References Cited

U.S. PATENT DOCUMENTS

| | | | |
|---|---|---|---|
| 3,629,792 A | 12/1971 | Dorrell | |
| 4,079,193 A * | 3/1978 | Channell | H02G 15/013 174/138 F |
| 4,255,614 A * | 3/1981 | Channell | H02G 1/145 174/77 R |
| 4,595,724 A * | 6/1986 | Koblitz | C08K 3/22 174/74 A |
| 4,643,506 A | 2/1987 | Kobler | |
| 4,713,021 A | 12/1987 | Kobler | |
| 4,791,245 A * | 12/1988 | Thornley | H01R 4/72 174/73.1 |
| 5,009,610 A | 4/1991 | Woskow | |

(Continued)

FOREIGN PATENT DOCUMENTS

| | | |
|---|---|---|
| JP | S51-042492 U | 3/1976 |
| JP | H09-007686 A | 1/1997 |

(Continued)

OTHER PUBLICATIONS

Aug. 26, 2020—U.S. Non-final Office Action—U.S. Appl. No. 16/738,696.

*Primary Examiner* — Chau N Nguyen
(74) *Attorney, Agent, or Firm* — Banner & Witcoff, Ltd.

(57) ABSTRACT

A waterproof structure includes a first seal portion covering around an electric wire to be inserted into a mounting hole of an object to which the electric wire is mounted, the electric wire having a conductor and an insulation covering the conductor, and the first seal portion being elastic and electrically insulative, a housing provided at an end portion of the electric wire, the housing covering the first seal portion, the housing being made of an insulating resin having higher rigidity than the first seal portion and a second seal portion covering around the electric wire, being provided contiguously with an end portion of the housing, and being elastic and electrically insulative.

10 Claims, 7 Drawing Sheets

(56) References Cited

U.S. PATENT DOCUMENTS

| | | | |
|---|---|---|---|
| 5,170,017 A | 12/1992 | Stanevich et al. | |
| 5,574,259 A * | 11/1996 | Meltsch | G02B 6/445 174/91 |
| 5,793,920 A * | 8/1998 | Wilkins | G02B 6/4446 385/135 |
| 6,039,603 A | 3/2000 | Wakata et al. | |
| 6,621,005 B1 * | 9/2003 | Lovec | A61B 1/00114 174/74 R |
| 7,056,151 B2 * | 6/2006 | Cawood | H01R 13/5213 439/521 |
| 7,393,218 B1 | 7/2008 | Pavlovic et al. | |
| 7,959,468 B2 | 6/2011 | Yong et al. | |
| 8,740,655 B2 | 6/2014 | Kato et al. | |
| 8,803,006 B2 | 8/2014 | Imahori et al. | |
| 8,979,582 B2 | 3/2015 | Tanaka et al. | |
| 9,029,699 B2 | 5/2015 | Kato | |
| 9,716,338 B2 * | 7/2017 | Brown | H01R 24/58 |
| 2006/0068637 A1 | 3/2006 | Meleck et al. | |
| 2008/0233796 A1 | 9/2008 | Segrt | |
| 2010/0075535 A1 | 3/2010 | Mizutani et al. | |
| 2011/0207354 A1 | 8/2011 | Tashiro | |
| 2012/0040571 A1 | 2/2012 | Yoshioka et al. | |
| 2012/0058660 A1 | 3/2012 | Aoki et al. | |
| 2012/0282794 A1 | 11/2012 | Brune et al. | |
| 2015/0099396 A1 | 4/2015 | Mori et al. | |
| 2016/0148722 A1 * | 5/2016 | Hagi | H01B 7/2825 174/128.1 |
| 2016/0268733 A1 | 9/2016 | Kato et al. | |
| 2018/0048081 A1 * | 2/2018 | Komori | H01R 13/5208 |
| 2018/0163728 A1 | 6/2018 | Zugelder et al. | |
| 2020/0119468 A1 | 4/2020 | Tanaka et al. | |
| 2020/0227908 A1 | 7/2020 | Iizuka et al. | |

FOREIGN PATENT DOCUMENTS

| | | |
|---|---|---|
| JP | 2002-008793 A | 1/2002 |
| JP | 2002-302601 A | 10/2002 |
| JP | 2003-234138 A | 8/2003 |
| JP | 2011-014260 A | 1/2011 |
| JP | 2014-007112 A | 1/2014 |
| JP | 2015-037007 A | 2/2015 |
| JP | 2015-070735 A | 4/2015 |
| WO | 2015/022841 A1 | 2/2015 |
| WO | 2018/235314 A1 | 12/2018 |

\* cited by examiner

WATERPROOF STRUCTURE

CROSS-REFERENCE TO RELATED APPLICATION

The present application claims priority to Japanese Patent Application No. 2019-004453 filed on Jan. 15, 2019, the entire content of which is incorporated herein by reference.

TECHNICAL FIELD

The present invention relates to a waterproof structure.

BACKGROUND

A related art waterproof structure is configured to provide waterproof property between a mounting hole of an object to which an electric wire is mounted and the electric wire to be inserted into the mounting hole (see, e.g., JP2014-7112A). The connector includes a seal portion and a housing. The seal portion is formed of an insulating elastic material that integrally covers an insulation of the electric wire and the housing is formed of an insulating resin having higher rigidity than the elastic material that integrally covers the seal portion at an end portion of the electric wire. The seal portion formed of the elastic material is primarily molded on the insulation of the electric wire. The housing formed of the insulating resin is secondarily molded to cover the seal portion. In the connector, an elastic material is used for the primarily molded seal portion, so that a waterproof function is imparted and stress during bending of the electric wire is reduced.

As described above, in the waterproof structure of the connector in the related art, a cylindrical elastic material is provided to be in contact with an outer peripheral surface of an electric wire insulation (hereinafter simply referred to as "insulation") of the electric wire. An elastomer or the like for ensuring water tightness is preferably used for the elastic material.

However, in the waterproof structure in the related art, due to a difference in linear expansion coefficient of the insulation, the elastomer and the housing material, a part of the elastomer that is overlapped by the housing may be pushed out of the housing. Therefore, in the waterproof structure in the related art, an appearance defect, wire breakage or a decrease in waterproof function caused by wrinkles may occur.

SUMMARY

The present invention provides a waterproof structure by which the appearance defect, the wire breakage and the decrease in waterproof function caused by wrinkles can be prevented.

According to an illustrative aspect of the present invention, a waterproof structure includes a first seal portion covering around an electric wire to be inserted into a mounting hole of an object to which the electric wire is mounted, the electric wire having a conductor and an insulation covering the conductor, and the first seal portion being elastic and electrically insulative, a housing provided at an end portion of the electric wire, the housing covering the first seal portion, the housing being made of an insulating resin having higher rigidity than the first seal portion and a second seal portion covering around the electric wire being provided contiguously with an end portion of the housing and being elastic and electrically insulative.

BRIEF DESCRIPTION OF DRAWINGS

FIGS. 3A and 3B are schematic views illustrating operation of a waterproof structure in the related art in which

DETAILED DESCRIPTION

Figure 1A:
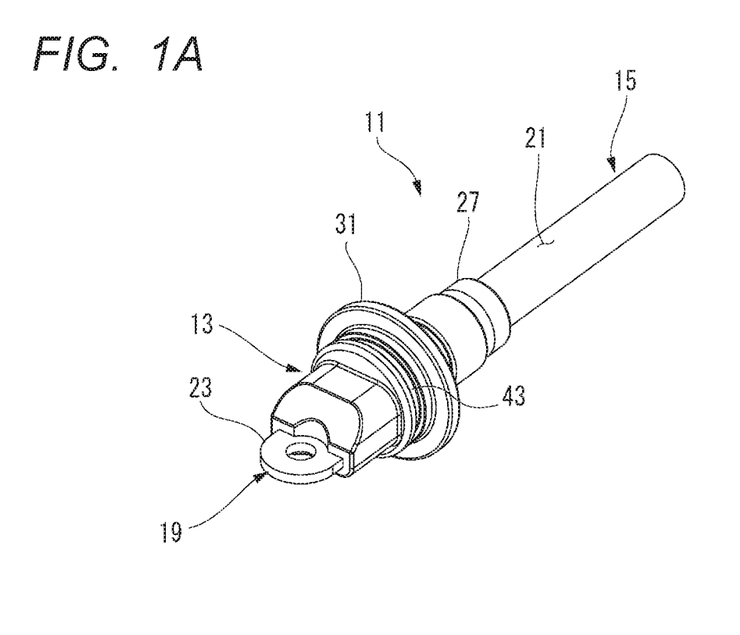
FIG. 1A is a perspective view of a connector having a waterproof structure according to an embodiment of the present invention.
Figure 1B:
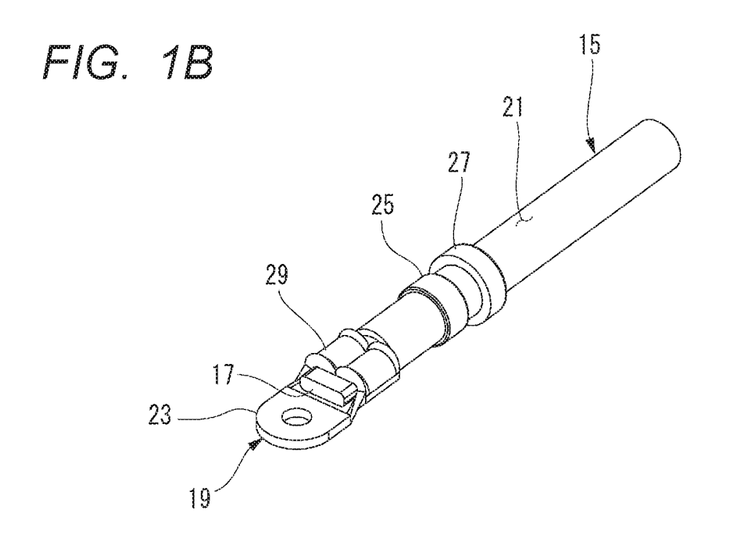
FIG. 1B is a perspective view of the connector in FIG. 1A in which a housing is removed.

Hereinafter, embodiments of the present invention will be described with reference to the drawings. FIG. 1A is a perspective view of a connector 11 having a waterproof structure according to an embodiment of the present invention, and FIG. 1B is a perspective view of the connector 11 in FIG. 1A in which a housing 13 is omitted. The waterproof structure according to the embodiment is applied to a so-called over-molded connector in which, as shown in FIGS. 1A and 1B, a terminal 19 is connected to a conductor 17 of an electric wire 15, and an end portion of the electric wire 15 and a part of the terminal 19, which are connection portions where the conductor 17 and the terminal 19 are connected to each other, are covered by an insulating resin molded product.

In the connector 11, the terminal 19 is conductively connected to the end portion of the electric wire 15 that can be obtained by covering the conductor 17 by the insulation 21. The electric wire 15 is to be inserted through a mounting hole of a mounting portion (not shown). The electric wire 15 may be an electric wire that can be obtained by covering the conductor 17 only by the insulation 21 or may be a shielded electric wire in which an inner insulating cover covering the conductor 17 is covered by a shielding member such as a metal braid and the shielding member is further covered by a jacket.

The terminal 19 is connected and fixed to the conductor 17, the conductor 17 being exposed at the end portion of the electric wire 15. The connection structure between the terminal 19 and the conductor 17 may be any one of a crimping structure, a pressure welding structure, a welding structure, a brazing structure, or the like. In the embodiment, the terminal 19 is exemplified to be a flat terminal in which an electric contact portion 23 is a male tab type, but the terminal 19 may be a round terminal, a Y-shaped terminal, or the like or may be a female terminal having a box-shaped electric contact portion.

The waterproof structure according to the embodiment is configured as a connector 11 in which an insulating elastic member such as a thermoplastic elastomer is primarily molded as a first seal portion 25 and a second seal portion 27 on the outer periphery of the electric wire 15, and then an insulating resin such as a thermoplastic resin is secondarily molded as a housing 13 on the first seal portion 25 and a part of the terminal 19. At this time, the second seal portion 27 is molded contiguously with one end portion of the housing 13.

In the connector 11, the terminal 19 is conductively connected to the conductor 17 of the electric wire 15 at the end portion of the electric wire 15. A connection portion 29 of the terminal 19, at which the terminal 19 is connected to the conductor 17, is covered by the housing 13. The electric contact portion 23 on a side opposite to the connection portion 29 projects to the outside of the housing 13.

The housing 13 is formed of an insulating resin (for example, PBT) having higher rigidity than the elastic material forming the first seal portion 25 or the second seal portion 27. The housing 13 integrally covers a part of the first seal portion 25 at the end portion of the electric wire 15 and the connection portion 29 of the terminal 19. The housing 13 covers an entirety of the first seal portion 25. The housing 13 includes a flange portion 31 that protrudes radially outward at a substantially central portion of the housing 13 in a direction along the electric wire 15. The flange portion 31 is to abut the mounting portion including the mounting hole. A peripheral groove 43 is formed on an outer periphery of the housing 13 at a position closer to the terminal side than the flange portion 31. An annular elastic seal member (not shown) is mounted on the peripheral groove 43.

As shown in FIG. 1B, the primarily molded first seal portion 25 and second seal portion 27 are annular bodies having different outer diameters and separated by a predetermined distance, and are in contact with an outer peripheral surface of the insulation 21. In the embodiment, an outer diameter of the second seal portion 27 is formed to be larger than an outer diameter of the first seal portion 25. The second seal portion 27 functions as a seal portion that water-tightly seals a gap between the housing 13 and the insulation 21. Also the second seal portion 27 serves as a portion (abutted portion) which a molded burr cutter is to abut.

In the secondary molding using an injection molding machine, when the housing 13 is molded, it is necessary to prevent occurrence of burrs caused by leakage of molten resin when the molten resin is press-fitted into a mold cavity. For this reason, the second seal portion 27 servers as the abutting portion. The burr cutter includes a plurality of mountainous sharp tip end portions to sandwich the electric wire 15. Therefore, in a case where the housing 13 is directly formed on the outer periphery of the electric wire 15, the insulation 21 may be damaged when the electric wire 15 is arranged in the mold. In the waterproof structure of the embodiment, since the burr cutter provided in a mold for secondary molding is to be in contact with the outer periphery of the second seal portion 27 molded by the primary molding, the insulation 21 of the electric wire 15 is not damaged by the burr cutter.

Figure 2A:
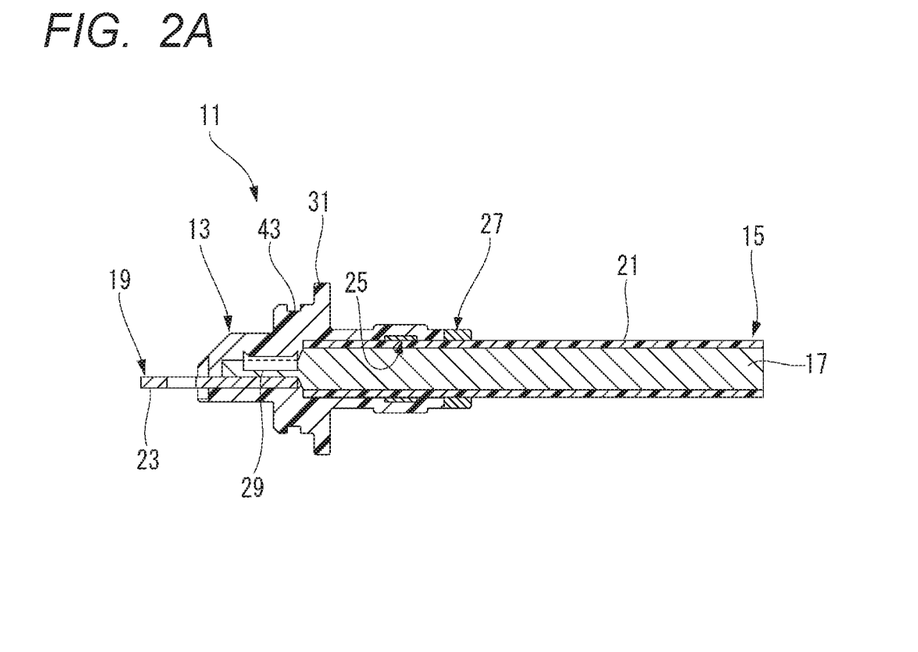
FIG. 2A is a longitudinal cross-sectional view of the connector shown in FIG. 1A.
Figure 2B:
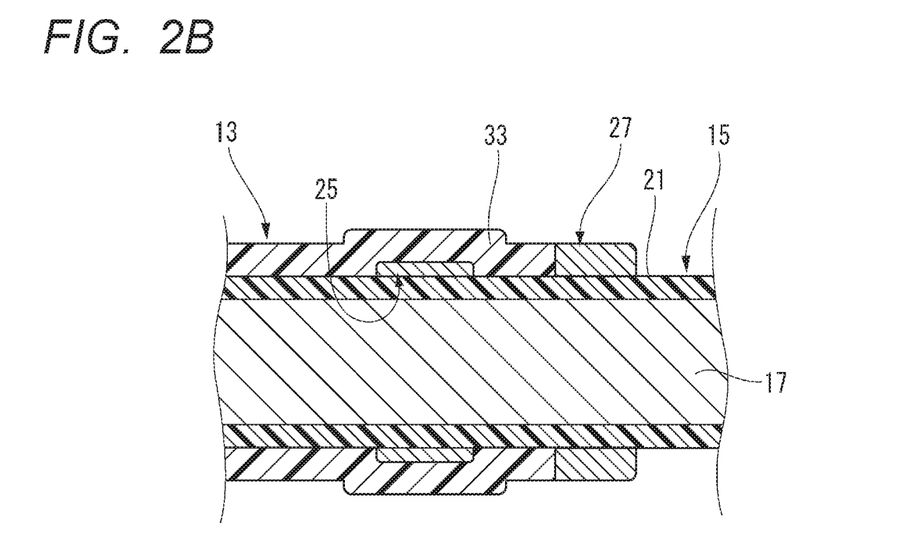
FIG. 2B is a main part enlarged view of a first seal portion and a second seal portion in FIG. 2A.

FIG. 2A is a longitudinal cross-sectional view of the connector 11 shown in FIG. 1A, and FIG. 2B is a main part enlarged view of the first seal portion 25 and the second seal portion 27 in FIG. 2A. In the waterproof structure according to the embodiment, an annular first seal portion 25 that is primarily molded by an elastic member covers the electric wire 15. The first seal portion 25 is embedded in the housing 13. That is, the first seal portion 25 is an annular embedded portion. At one end portion of the housing 13, the second seal portion 27 made of the same elastic member as the first seal portion 25 is molded at the same time as the primary molding of the first seal portion 25. The second seal portion 27 is provided contiguously with the one end portion of the housing 13.

In the embodiment, the first seal portion 25 and the second seal portion 27 are formed of the same material. The material can be, for example, an elastomer.

In the embodiment, a width of the one end portion of the housing 13 in a radial direction of the housing 13 and a width of the second seal portion 27 in a radial direction of the second seal portion 27 are formed substantially the same. In other words, the one end portion of the housing 13 and the second seal portion 27 have a substantially same outer diameter. Therefore, the one end portion of the housing 13 formed in a cylindrical shape around the electric wire 15 is contiguous with the second seal portion 27 without a step. The one end portion of the housing 13 has the same outer diameter as the second seal portion 27.

In the waterproof structure according to the embodiment, at least one of the first seal portion 25 and the second seal portion 27 may be a heat-shrinkable tube or a solidified adhesive. If the first seal portion 25 and the second seal portion 27 are formed of a heat-shrinkable tube or an adhesive, primary molding performed by a mold can be omitted. In this case, in the waterproof structure according to the embodiment, the housing 13 is molded after the first seal portion 25 and the second seal portion 27 are formed by a heat-shrinkable tube or an adhesive.

Next, operation of the above configuration will be described. Before describing the operation of the waterproof structure according to the embodiment, operation of a waterproof structure in the related art will be described with reference to FIGS. 3A and 3B and FIG. 4.

Figure 3A:
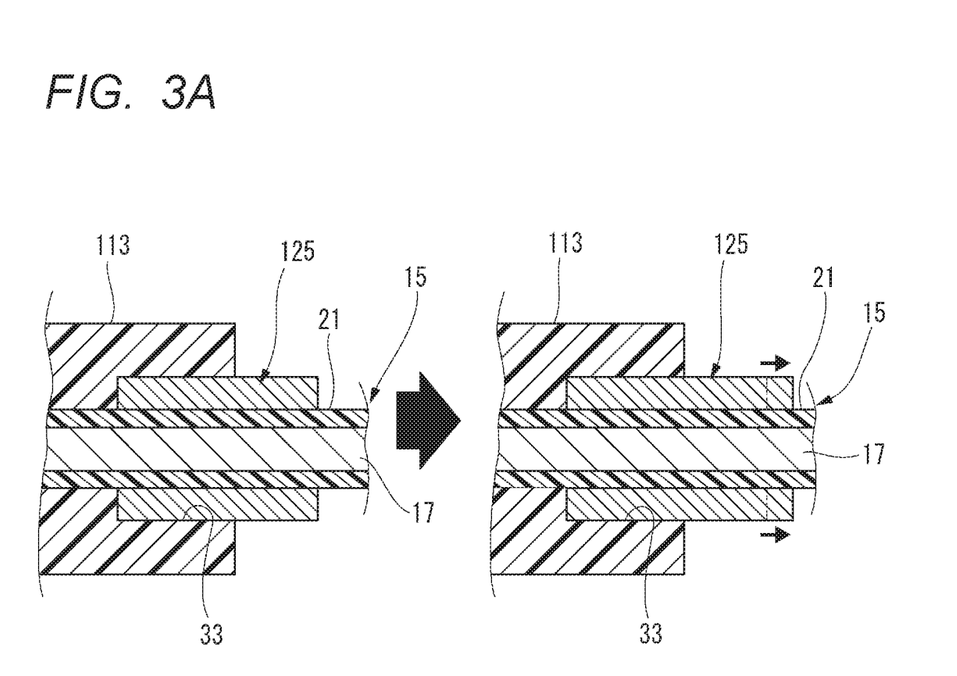
FIG. 3A is a schematic view illustrating behavior during thermal expansion and FIG. 3B is a schematic view illustrating behavior during thermal contraction.

As shown in FIG. 3A, in the waterproof structure for waterproofing between a mounting hole and an electric wire inserted through the mounting hole, a cylindrical elastic member is provided in contact with the outer periphery of the insulation 21. The elastic member serves as a seal portion 125 for ensuring water tightness. An example of a material of the elastic member can include an elastomer. The seal portion 125 is primarily molded on the outer periphery of the insulation 21. A housing 113 is further secondarily molded on an outer periphery of the seal portion 125 and is in close contact therewith. The housing 113 is made of a material, for example, polybutylene terephthalate (PBT) having higher rigidity than that of the seal portion 125. That is, between the electric wire 15 and the housing 113, the conductor 17 of the electric wire 15, the insulation 21, the seal portion 125, and the housing 113 are laminated radially outward from a central side. Here, the cylindrical seal portion 125 is provided in an annular groove portion 33 (with reference to FIGS. 3A and 3B) of the housing 113 in which one end portion in an axial direction is closed and the other end portion is opened. Therefore, an end portion (a right end portion in FIGS. 3A and 3B) of the seal portion 125 extends from the housing 113 to the outside.

This type of waterproof structure to be mounted on a vehicle is exposed to a large temperature change. The temperature change is, for example, in a range from −40° C. to 120° C. In the range from −40° C. to 120° C., linear expansion coefficients of the members forming the respective structural portions are as follows in a descending order: the conductor 17 (copper alloy or aluminum alloy), the insulation 21 (cross-linked polyethylene), the first seal portion 25 (elastomer), and the housing 13 (PBT).

The waterproof structure in the related art may behave such that the appearance and the waterproof performance are degraded due to a temperature change since the members having different linear expansion coefficients are in contact with each other in a laminated structure. By each part getting expanded and contracted repeatedly, the members move and the movement (displacement) of the insulation 21 is larger than other members in the above-described laminated structure, excluding the conductor 17 considering the conductor 17 does not directly affect the appearance and waterproof performance.

Figure 3B:
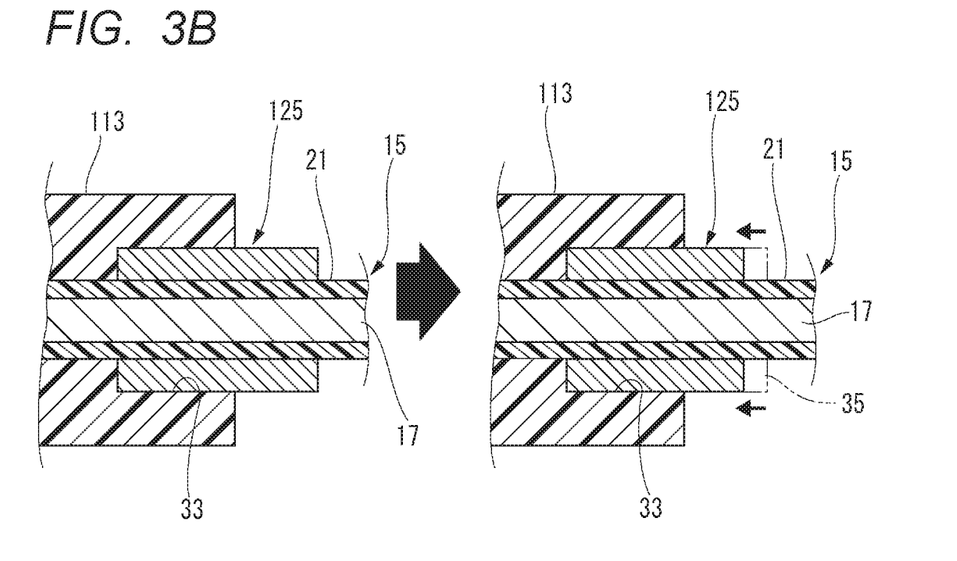
Figure 4:
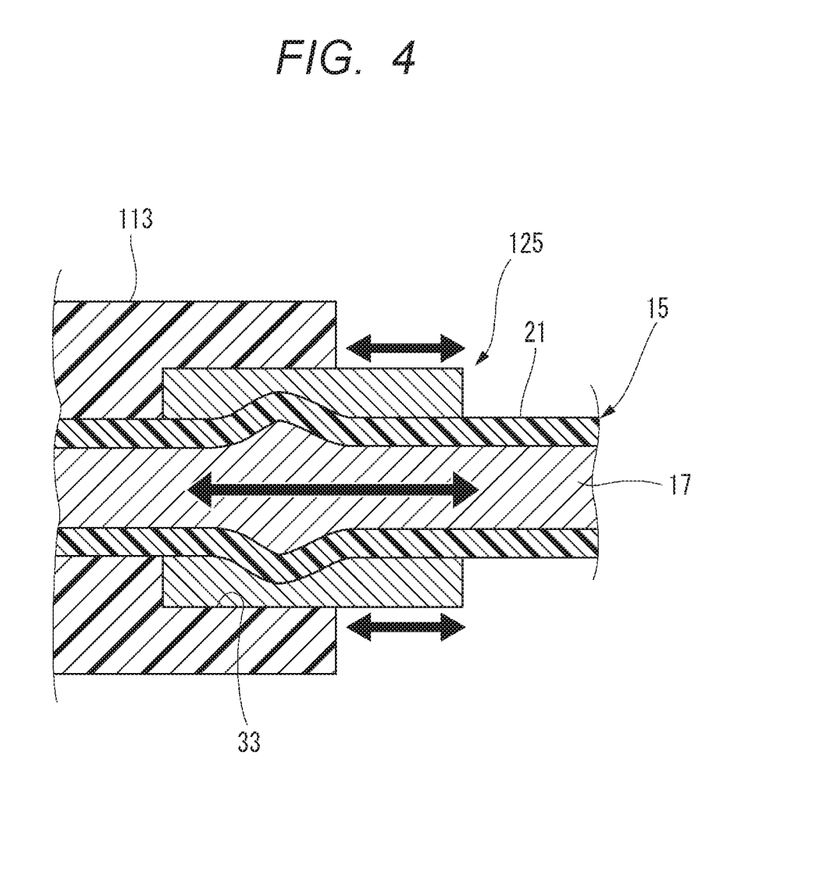
FIG. 4 is a schematic view of the waterproof structure in which an insulation is deformed due to thermal expansion and contraction.

FIGS. 3A and 3B are schematic views illustrating the operation of the waterproof structure in the related art. FIG. 3A is a schematic view illustrating behavior during thermal expansion, and FIG. 3B is a schematic view illustrating behavior during thermal contraction. FIG. 4 is a schematic view of the waterproof structure in which the insulation 21 is deformed due to thermal expansion and contraction. In the seal portion 125 in the laminated structure, an interface with the insulation 21 follows the movement of the insulation 21 due to the temperature change. Meanwhile, in the seal portion 125 in the laminated structure, due to repeated thermal expansion and contraction, as shown in FIG. 3A, a volume in a thickness direction outside the interface is pushed out of the housing 113 from the annular groove portion 33 which overlaps the seal portion 125, to form a bulging portion 35. For this reason, as shown in FIG. 3B, after the insulation 21 that is in contact with the seal portion 125 and has a greater tendency to move than other members is moved due to thermal contraction, the bulging portion 35 is unlikely to return to an original position thereof. Therefore, as shown in FIG. 4, when the expansion and contraction of the seal portion 125 is repeated, wrinkles and deformation occur in the insulation 21. As a result, in the waterproof structure in the related art, the appearance defect or the decrease in waterproof function may occur by the deformation of the insulation 21.

Therefore, in the waterproof structure of the embodiment, the first seal portion 25 made of an elastic member covering the electric wire 15 is covered by the housing 13 formed of an insulating resin having higher rigidity than the elastic member. The housing 13 embeds the first seal portion 25 in a molded body by covering the first seal portion 25 together with the electric wire 15. That is, the first seal portion 25 is an annular embedded portion inside the housing 13. The annular second seal portion 27 made of an elastic member is contiguously formed at the one end portion of the housing 13 that covers the first seal portion 25.

Accordingly, since the first seal portion 25 is an annular embedded portion inside the housing, the first seal portion 25 does not protrude out of the housing 13 despite a difference in linear expansion coefficient, with respect to a normal structure in which one end portion of the tubular seal portion extends to the outside from the annular groove 33 which is an overlapping part of the housing 13.

In the waterproof structure of the embodiment, due to the second seal portion 27 provided at the one end portion of the housing 13, damage to the electric wire 15 caused by the sandwiching of a mold matching portion can be prevented.

Further, in the waterproof structure of the embodiment, since the second seal portion 27 that is made of an elastic member and is contiguous with the housing 13 covers the electric wire 15, the stress acting on the electric wire 15 when the electric wire 15 led out from a rear end of the housing 13 is bent can be reduced by the deformation of the second seal portion 27.

The second seal portion 27 contiguous with one end portion of the housing 13 is an elastic member, so that the second seal portion 27 can water-tightly seal a gap between the housing 13 and the electric wire 15. That is, the waterproof structure of the configuration can be configured as a double waterproof structure of the housing 13 and the electric wire 15 by providing both the first seal portion 25 and the second seal portion 27.

Accordingly, in the waterproof structure of the embodiment, the protrusion of the first seal portion 25 is restricted, and the deformation of the insulation 21 in contact with the first seal portion 25 is reduced, so that the appearance defect and the decrease in waterproof function can be prevented.

In the waterproof structure of the embodiment, the first seal portion 25 and the second seal portion 27 are both formed of the elastic member, so that the first seal portion 25 and the second seal portion 27 are primary molded at the same time using the same mold and the same molding resin material. Accordingly, the manufacturing process can be simplified.

In the waterproof structure of the embodiment, the height at which the outer peripheral surface of the one end portion of the housing 13 is provided and the height at which the outer peripheral surface of the second seal portion 27 is provided are formed substantially the same with each other. Therefore, a joint area in the height direction (distance in the radial direction of the electric wire 15) between the housing 13 and the second seal portion 27 can be maximized. Accordingly, the housing 13 and the second seal portion 27 can be hardly separated. As a result, it is possible to obtain a molded product more excellent in surface appearance.

In the waterproof structure of the embodiment, the primary molding step using a mold can be omitted by making both the first seal portion 25 and the second seal portion 27 with a heat-shrinkable tube or a solidified adhesive. Accordingly, the mold cost for the primary molding is eliminated. When either one of the first seal portion 25 or the second seal portion 27 is formed into a heat-shrinkable tube or a solidified adhesive, the mold cost for the primary molding can be simplified.

Figures 5A, 5B:
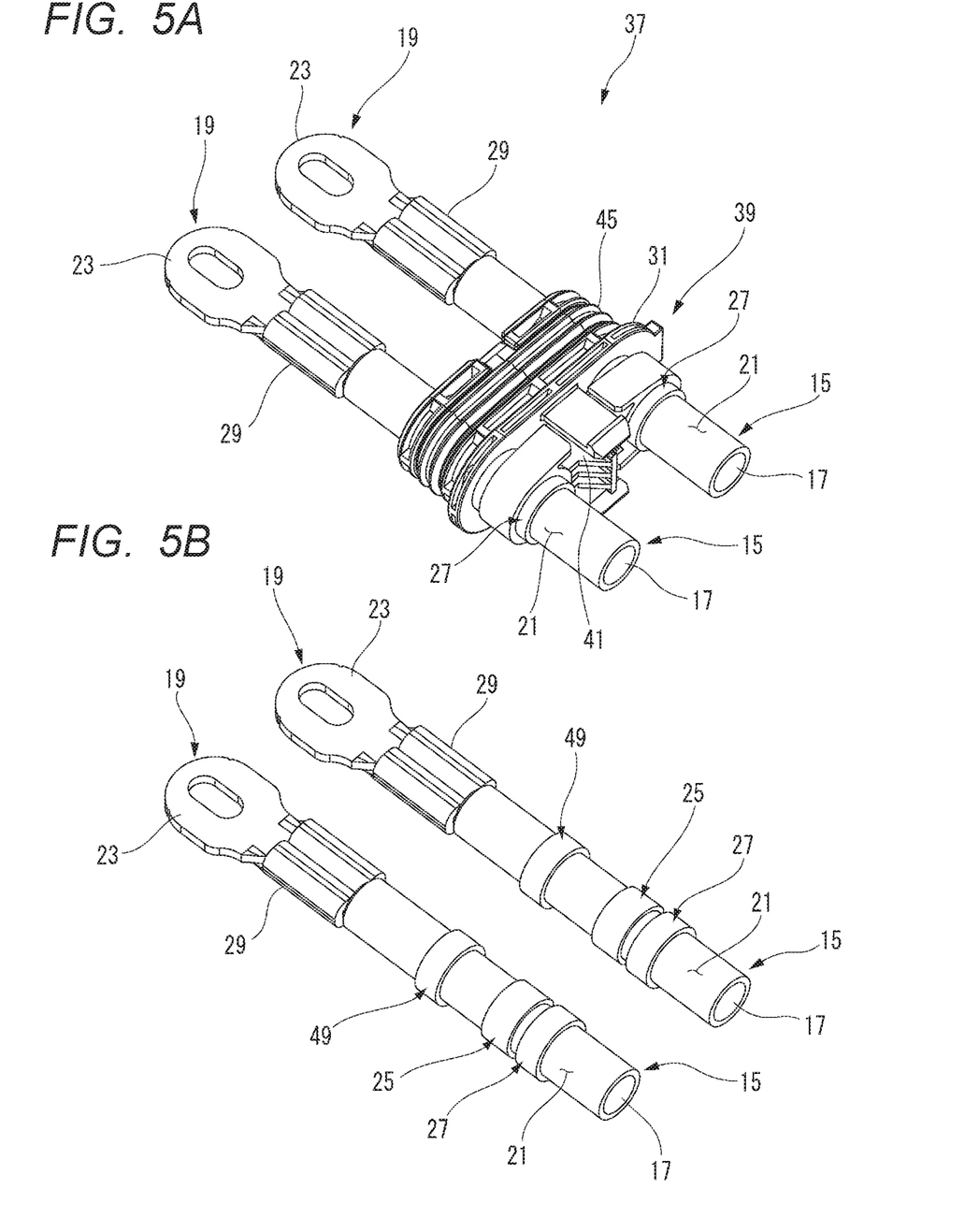
FIG. 5A is a perspective view of a connector having a waterproof structure according to another embodiment of the present invention.
FIG. 5B is a perspective view of the connector in FIG. 5A in which a housing is omitted.

Next, a waterproof structure according to another embodiment of the present invention will be described. FIG. 5A is a perspective view of a connector 37 having a waterproof structure according to the another embodiment of the present invention, and FIG. 5B is a perspective view of the connector 37 in FIG. 5A in which a housing 39 is omitted. In the another embodiment, the same members as those described in the above embodiment are denoted by the same reference numerals, and repetitive descriptions thereof will be omitted. In the waterproof structure of the another embodiment, at the end portion of the electric wire 15, the terminal 19 is conductively connected to the conductor 17 of the electric wire 15 from which the insulation 21 is stripped off. The housing 39 covers the electric wires 15 excluding the connection portions 29 at which the respective terminals 19 and conductors 17 are connected to each other.

The connector 37 is provided for a plurality (two in the embodiment) of the electric wires 15 in which the terminals 19 are conductively connected to the conductors 17 respectively. The housing 39 integrally covers a gap between the two electric wires 15. That is, the gap serves as a connection portion 41 that is secondarily molded by an insulating resin by which the housing 39 is molded. The housing 39 includes a flange portion 31 that protrudes radially outward at a substantially central portion of the housing 39 in a direction along the electric wire 15. The flange portion 31 is to abut the mounting portion including the mounting hole.

Figure 6A:
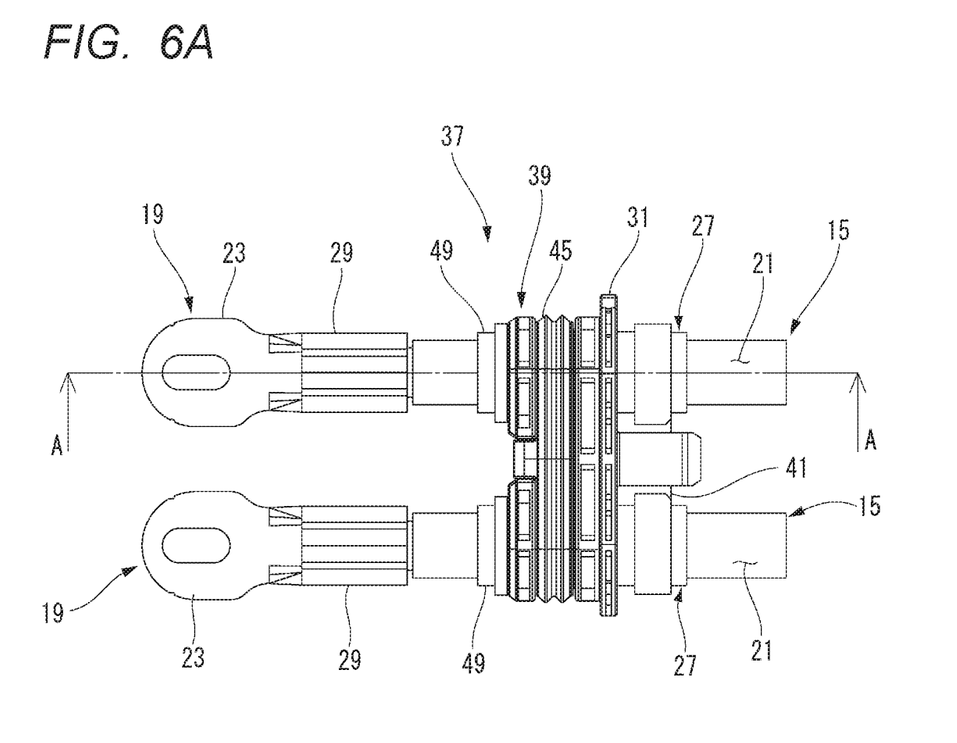
FIG. 6A is a plan view of the connector shown in FIG. 5A.
Figure 6B:
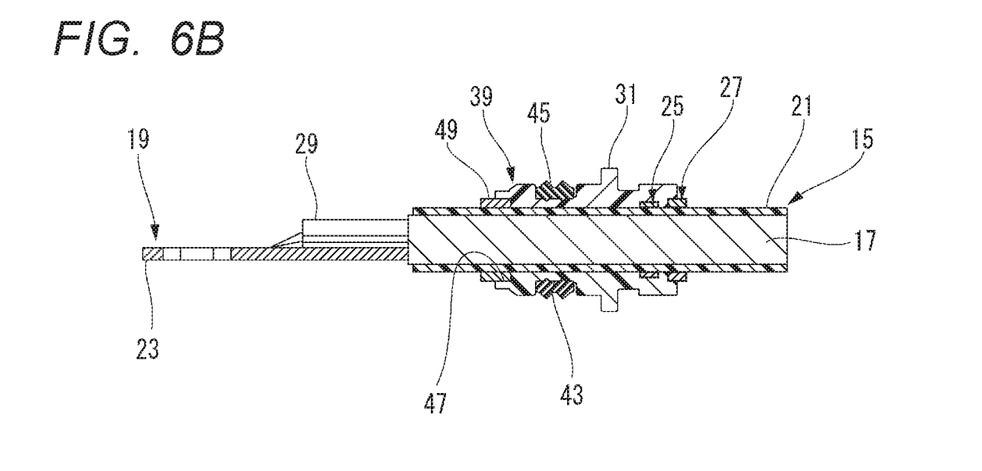
FIG. 6B is a cross-sectional view taken along a line A-A in FIG. 6A.

FIG. 6A is a plan view of the connector 37 shown in FIG. 5A, and FIG. 6B is a cross-sectional view taken along a line A-A in FIG. 6A. In the waterproof structure according to the another embodiment, a part of the second seal portion 27 is covered by the housing 39.

In the connector 37 according to the another embodiment, the peripheral groove 43 is formed on an outer periphery of the housing 39 at a position closer to the terminal 19 than the flange portion 31. An annular elastic seal member 45 to be in contact with an inner peripheral wall of the mounting portion is mounted on the peripheral groove 43. The elastic seal member 45 water-tightly seals a gap between the housing 39 and the inner peripheral wall of the mounting portion. An annular groove portion 47 is formed in the housing 39 on an end surface opposite to the first seal portion 25. A third seal portion 49 made of an elastic member is provided in the annular groove portion 47. The third seal portion 49 can be formed by primary molding similarly to the first seal portion 25. The third seal portion 49 water-tightly seals a gap between the insulation 21 and the housing 39 on the end surface of the housing 39 opposite to the first seal portion 25.

In the waterproof structure according to the another embodiment, since a part of the second seal portion 27 is embedded in and covered by the housing 39, a large joint surface between the housing 39 and the second seal portion 27 can be secured. Since it is possible to increase the joint surface between the housing 39 and the second seal portion 27 (that is, the joint surface between an outer peripheral surface of the insulation 21 and an inner peripheral surface of the housing 39 being in contact with each other) in which a separation direction is a shear direction, the joining strength between the housing 39 and the second seal portion 27 can be increased as compared with a joint structure only with end surfaces being in contact with each other.

In the waterproof structure of the another embodiment, the terminal 19 is conductively connected to the conductor 17 that is exposed by removing the insulation 21 at the end portion of the electric wire 15. The housing 39 covers the electric wires 15 excluding the connection portions 29 of the respective terminals 19 and conductors 17. That is, the housing 39 is provided at a position of the electric wire 15 in the middle of the electric wire 15, the position being away from the terminal 19 that is conductively connected to the end portion of the electric wire 15. The annular elastic seal member 45 is mounted on the peripheral groove 43 that is on the outer periphery of the housing 39. The elastic seal member 45 water-tightly seals a gap between the housing 39 and the mounting hole of the mounting portion. Therefore, in the waterproof structure of the another embodiment, due to the operation described above, the electric wire 15 in which the terminal 19 is conductively connected with the end portion of the electric wire 15 can be passed through the mounting portion in a water-tight structure, while preventing the appearance defect of the insulation 21 and the decrease in waterproof function.

Figure 7A:
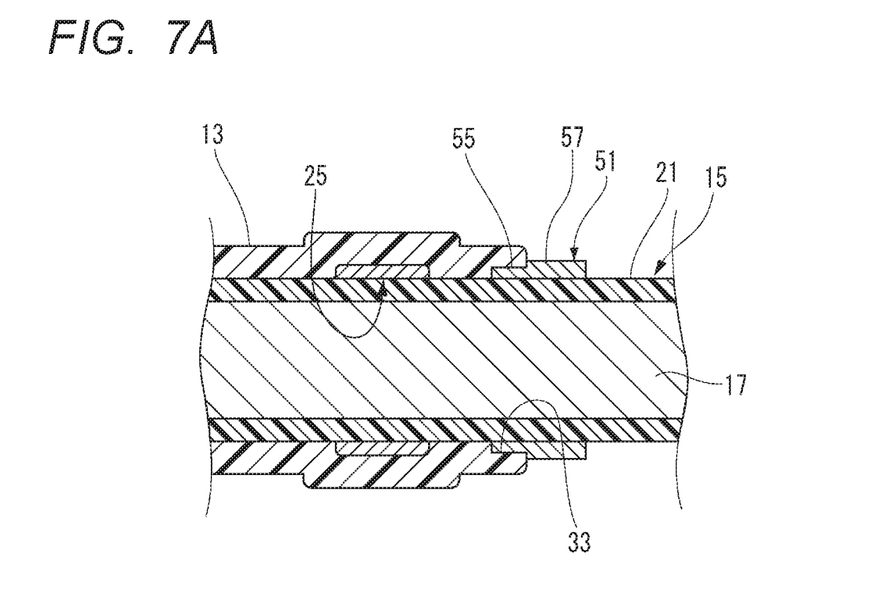
FIG. 7A is a longitudinal cross-sectional view of a first seal portion and a second seal portion according to a modification.
Figure 7B:
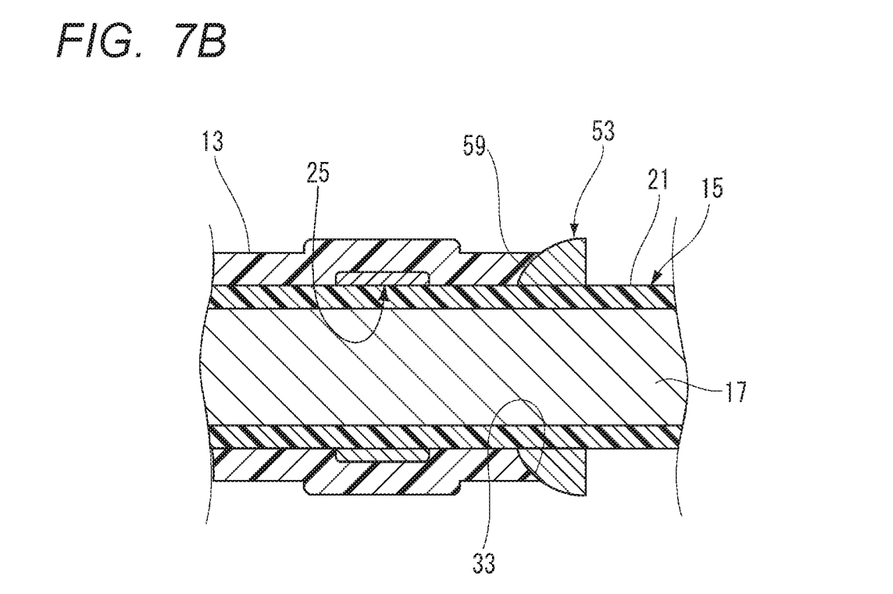
FIG. 7B is a longitudinal cross-sectional view of a first seal portion and a second seal portion according to another modification.

Next, modifications of the waterproof structure according to the embodiment and the another embodiment will be described. FIG. 7A is a longitudinal cross-sectional view of a first seal portion 25 and a second seal portion 51 according to a modification, and FIG. 7B is a longitudinal cross-sectional view of the first seal portion 25 and a second seal portion 53 according to another modification. In the waterproof structure according to the modification, as shown in FIG. 7A, a part of the second seal portion 51 is covered by the housing 13. In the modification, a part of the second seal portion 51 that is overlapped by the housing 13 is formed to be smaller in outer diameter than the other part.

In the waterproof structure according to the modification, since a part of the second seal portion 51 is embedded in and covered by the housing 13, a large joint surface between the housing 13 and the second seal portion 51 can be secured. Since it is possible to increase the joint surface between the housing 13 and the second seal portion 51 (that is, the joint surface between an outer peripheral surface of the insulation 21 and an inner peripheral surface of the housing 13 being in contact with each other) in which a separation direction is a shear direction, the joining strength between the housing 13 and the second seal portion 51 can be increased as compared with a joint structure only with end surfaces being in contact with each other.

A part of the second seal portion 51 which is overlapped by the housing 13 is a thin-wall annular portion 55, and the other part is a thick-wall annular portion 57. Accordingly, as compared with a structure in which inner diameter and outer diameter of the second seal portion 51, throughout an entire longitudinal direction of the second seal portion 51, are the same, a wall thickness (amount) of the second seal portion 51 in the annular groove portion 33 of the housing 13 is smaller than that of the thick-wall annular portion 57, so that an amount to be pushed out of the housing 13 is reduced during thermal expansion. Accordingly, the displacement (residual deformation) of the second seal portion 51 caused by thermal expansion and thermal contraction is prevented. As a result, the insulation 21 that is in contact with the second seal portion 51 is less deformed, and the appearance defect and the decrease in waterproof function are prevented.

In the waterproof structure according to the another modification, as shown in FIG. 7B, at least a part of the second seal portion 53 that is overlapped by the housing 13 includes a tapered surface 59 whose outer diameter gradually decreases toward the housing 13.

The tapered surface 59 can be set to a convex curved surface. The tapered surface 59 may be set to a flat inclined surface. In addition, the tapered surface 59 can also be set to a concave curved surface.

In the waterproof structure according to the modification, the second seal portion 53 includes the tapered surface 59, and thus a volume of second seal portion 53 that is overlapped by the housing 13 gradually decreases toward the housing 13. In other words, the volume of the second seal portion 53 gradually increases in a direction away from the housing 13. Even when the second seal portion 53 is pushed by the above-described operation, since the volume of the second seal portion 53 in the pushing direction side is increased, a push-out amount of the second seal portion 53, for which the second seal portion 53 has been pushed out of the housing 13 during thermal expansion, is decreased.

In the waterproof structure according to the above modification, the second seal portion 53 together with the insulation 21 is drawn in a direction toward the housing 13 during thermal contraction. The second seal portion 53 enters the annular groove portion 33 of the housing 13 due to the displacement in the drawing direction. At this time, since the second seal portion 53 is in contact with an inner peripheral wall of the housing 13 with the tapered surface 59 that is reduced in diameter toward a direction in which the second seal portion 53 enters the annular groove portion 33, the insulation 21 is pressed by a reaction force from the housing 13. Accordingly, the housing 13 and the second seal portion 53, the second seal portion 53 and the insulation 21, respectively contact with each other tightly by virtue of the reaction force from the housing 13.

Due to the operation, in the waterproof structure of the above modification, the displacement of the second seal portion 53 caused by thermal expansion and thermal contraction is prevented. As a result, the insulation 21 that is in contact with the second seal portion 53 is less deformed, and the appearance defect and the decrease in waterproof function are prevented.

Therefore, according to the waterproof structures of the respective embodiments described above, the appearance defect and wire breakage of the electric wire 15 and the decrease in waterproof function caused by wrinkles of the insulation 21 can be prevented.

According to the exemplary embodiments described above, a waterproof structure includes a first seal portion (25) covering around an electric wire (15) to be inserted into a mounting hole of an object to which the electric wire is mounted, the electric wire having a conductor and an insulation covering the conductor, and the first seal portion being elastic and electrically insulative a housing (13) provided at an end portion of the electric wire (15), the housing (13) covering the first seal portion (25), the housing (13) being made of an insulating resin having higher rigidity than the first seal portion (25) and a second seal portion (27) covering around the electric wire (15), the second seal portion (27) being provided contiguously with an end portion of the housing (13) and being elastic and electrically insulative.

According to the waterproof structure configured as above, since the first seal portion is an annular portion embedded inside the housing, the first seal portion does not protrude out of the housing due to a difference in linear expansion coefficient, compared with a structure in which one end portion of the tubular seal portion extends to the outside from the annular groove (which is an overlapping part with the first seal portion) of the housing 13. In the waterproof structure having the configuration, by virtue of the second seal portion provided at one end portion of the housing, damage to the electric wire caused by the electric wire being sandwiched by molds can be prevented. Further, in the waterproof structure of the embodiment, since the second seal portion that is made of an elastic member and is contiguous with the housing covers the electric wire, the stress acting on the electric wire when the electric wire being led out from a rear end of the housing is bent can be reduced by the second seal portion being deformed. Since the second seal portion being contiguous with one end portion of the housing is an elastic member, the second seal portion can water-tightly seal a gap between the housing and the electric wire. That is, the waterproof structure of the configuration can be configured as a double waterproof structure between the housing and the electric wire by providing both the first seal portion and the second seal portion. Accordingly, in the waterproof structure having the configuration, the protrusion of the first seal portion is restricted, and the deformation of the insulation being in contact with the first seal portion is reduced. As a result, the appearance defect and the decrease in waterproof function can be prevented.

In the waterproof structure described above, the first seal portion (25) and second seal portion (27) may be made of a same material.

According to the waterproof structure configured as above, since the first seal portion and the second seal portion are both formed of the elastic member, the first seal portion and the second seal portion can be primary molded at the same time using the same mold and the same molding resin material. Accordingly, the manufacturing process can be simplified.

In the waterproof structure described above, the end portion of the housing (13) and the second seal portion (27) may have a substantially same outer diameter.

According to the waterproof structure configured as above, a joint area in the height direction (distance in the radial direction of the electric wire) between the housing and the second seal portion can be maximized, which makes it difficult to separate the housing and the second seal portion. Accordingly, the double waterproof structure can be more reliable.

In the waterproof structure described above, a part of the second seal portion (27) may be covered by the housing (13).

According to the waterproof structure configured as above, since a part of the second seal portion is embedded in and covered by the housing, a surface area (joint surface) with which the housing and the second seal portion contact with each other can be largely secured. This structural configuration increases the joint surface between the housing and the second seal portion (that is, the joint surface with which an outer peripheral surface of the insulation and an inner peripheral surface of the housing contact with each other) in which a separation direction is a shear direction, the joint strength between the housing and the second seal portion can be increased as compared with a joint structure only with end surfaces being in contact with each other.

In the waterproof structure described above, at least one of the first seal portion (25) and the second seal portion (27) may be a heat-shrinkable tube or a solidified adhesive.

According to the waterproof structure configured as above, the primary molding step using a mold can be omitted by setting both the first seal portion and the second seal portion into a heat-shrinkable tube or a solidified adhesive. Accordingly, the mold cost for the primary molding is eliminated. When either one of the first seal portion and the second seal portion is formed into a heat-shrinkable tube or a solidified adhesive, the mold cost for the primary molding can also be simplified.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

What is claimed is:

1. A waterproof structure comprising:
   a first seal covering an electric wire to be inserted into a mounting hole of an object to which the electric wire is mounted, the electric wire having a conductor and an insulation, which covers the conductor, and the first seal being elastic and electrically insulative;
   a housing provided at an end portion of the electric wire, the housing covering the first seal such that the housing contacts an entirety of each of an outer surface and end surfaces of the first seal, and being made of an insulating resin having higher rigidity than the first seal; and a second seal, which covers the electric wire, the second seal being provided contiguously with an end portion of the housing, being spaced apart from the first seal, and being elastic and electrically insulative, wherein the end portion of the housing and the second seal have a substantially same outer diameter.

2. The waterproof structure according to claim 1, wherein the first seal and second seal are made of a same material.

3. The waterproof structure according to claim 1, wherein at least one of the first seal and the second seal is a heat-shrinkable tube.

4. The waterproof structure according to claim 1, wherein at least one of the first seal and the second seal is a solidified adhesive.

5. The waterproof structure according to claim 1, wherein the end portion of the housing covers the electric wire between the first seal and the second seal.

6. The waterproof structure according to claim 5, wherein the end portion of the housing contacts the electric wire between the first seal and the second seal.

7. The waterproof structure according to claim 1, wherein the second seal is provided contiguously with the end portion of the housing such that the second seal contacts a tip end surface of the end portion of the housing.

8. The waterproof structure according to claim 1, wherein an entirety of an inner peripheral surface of the first seal contacts the insulation.

9. A waterproof structure comprising:
a first seal covering an electric wire to be inserted into a mounting hole of an object to which the electric wire is mounted, the electric wire having a conductor and an insulation, which covers the conductor, and the first seal being elastic and electrically insulative;

a housing provided at an end portion of the electric wire, the housing covering the first seal such that the housing contacts an entirety of each of an outer surface and end surfaces of the first seal, and being made of an insulating resin having higher rigidity than the first seal; and a second seal, which covers the electric wire, the second seal being provided contiguously with an end portion of the housing, being spaced apart from the first seal, and being elastic and electrically insulative, wherein the housing covers a first part of the second seal and does not cover a second part of the second seal, wherein a diameter of the second part of the second seal is larger than a diameter of the first part of the second seal, and wherein at least a portion of the first part of the second seal includes a tapered outer surface where the diameter of the at least a portion of the first part of the second seal gradually decreases in a direction away from the second part of the second seal.

10. The waterproof structure of claim 9, wherein at least a portion of the second part of the second seal includes a tapered outer surface where the diameter of the at least a portion of the second part of the second seal gradually decreases in a direction approaching the first part of the second seal.

\* \* \* \* \*